Dec. 2, 1969 D. G. KRIESEN 3,481,522

COMPACTING DEVICE FOR TAPE LOOPS

Filed Dec. 12, 1967

INVENTOR
DENNIS G. KRIESEN
BY Ray S Pyle
ATTORNEY

United States Patent Office 3,481,522

Patented Dec. 2, 1969

3,481,522

COMPACTING DEVICE FOR TAPE LOOPS

Dennis G. Kriesen, Mentor, Ohio, assignor to Addressograph-Multigraph Corporation, Cleveland, Ohio, a corporation of Delaware Filed Dec. 12, 1967, Ser. No. 689,832
Int. Cl. B65h *17/42, 23/04*
U.S. Cl. 226—109 3 Claims

ABSTRACT OF THE DISCLOSURE

A tape reading device utilizing guide surfaces to route closed tape loops of various lengths into a compact area, and to prevent these loops from interfering with the operation of a similar reading device mounted immediately below.

BACKGROUND OF THE INVENTION

Tape readers have long been used in control systems for electronic equipment and complex machinery. A well known type of tape reader is marketed under the trademark Teletype.

The tape reader selected for illustration of this invention consists of a drive wheel and a sensing station. A tape, in the form of a continuous loop, is encoded with the desired control data and is passed through the sensing station and positioned to engage the drive wheel. The drive wheel advances the tape through the sensing station. At this point the encoded information is read from the tape and relayed through electronic circuitry to the machine or equipment that the reader is controlling.

With the advent of sophisticated systems, a greater number of tape readers are required in a limited space to perform these control functions.

The problem arises when a group of tape readers are mounted close together on a panel, one above the other, in an attempt to conserve space and form a compact unit. The tape loops vary in length, and the longer tapes hang down and tend to interfere with the operation of the readers mounted below. If the readers are spaced in such a way as to provide clearance for the various tape lengths, the panel on which they are mounted becomes excessively large.

In an effort to confine the tape in a limited area, a series of take-up pins were employed. The tape loop was around these pins in a tortuous path and sometimes a binding action against the pins resulted in a damaged tape.

The movie industry and related fields, and those who handle similar web materials, use elaborate devices to compact the area needed for dynamic storage.

SUMMARY OF THE INVENTION

The present invention relates to tape reading devices and in particular to the mounting of tape reading devices in close proximity.

The ability to mount tape readers close together is accomplished by guide surfaces, together with a novel system of routing the tape loop around these guide surfaces without binding. This routing system confines the tape in an appreciably smaller area than was previously required.

The advantage of this invention can then be readily visualized, in that a plurality of reading devices can be conveniently and successfully mounted on a comparatively small panel without interfering with one another.

Another advantage of this invention is that a minimum number of pins will provide compacting guidance, with insurance that the tape will not bind and rupture.

Another advantage and an object of this invention is that dynamic storage is provided at essentially no cost, with apparatus requiring no maintenance.

In accordance with these and other advantages, a better understanding of the present invention is set forth in the drawing and description of the preferred embodiment.

DESCRIPTION OF THE PREFERRED EMBODIMENT

Figure 1:
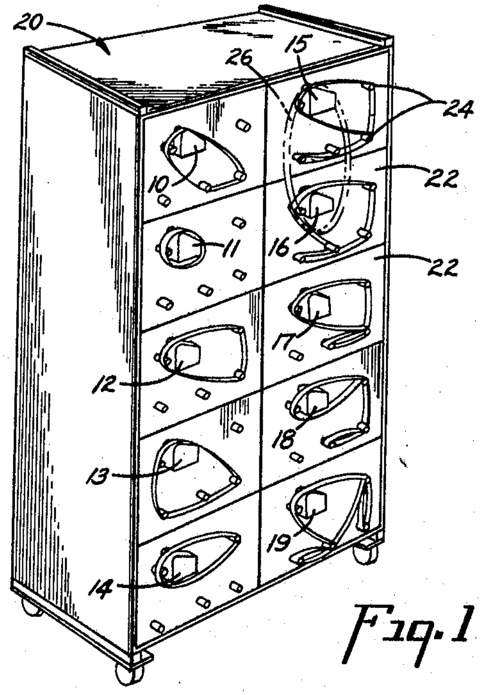
FIGURE 1 is a perspective view of a series of tape readers mounted on a control console.

FIGURE 1 illustrates a series of tape readers 10 through 19 mounted on a console 20. The console 20 contains electrical power to drive the tape readers and electronic circuitry required to relay information from the readers to the equipment they control. This electrical equipment is well known in the art and for that reason is not illustrated.

Each tape reader 10 through 19 is mounted on an individual panel 22. A plurality of guide pins 24 are arranged about each reader on the panel 22.

According to this invention, an endless tape in the form of a loop passes through the tape reader and is wound around the guide pins in a novel manner.

The tape lengths are determined by the control function they maintain in the system. For example, the reader 11 in FIGURE 1 may only perform a few repetitive operations and therefore is equipped with a very short tape. But the reader 19 may control many and various operations and requires a tape of appreciably longer length.

The reader 15 in FIGURE 1, has a tape 26 in phantom outline. The tape 26 illustrates how the loops would interfere with one another if they were merely draped over the readers. This interference could be eliminated by spacing the readers farther apart, but would require a much larger mounting panel.

The present invention of routing tapes around guide pins is designed to accept both short and long tape loops and confine them in a given area.

Figure 2:
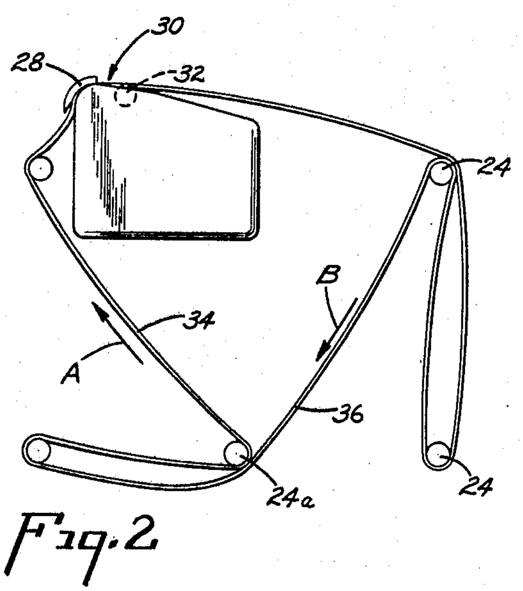
FIGURE 2 is an elevation view of a tape reader to an enlarged scale with respect to FIGURE 1, showing one particular tape routing pattern.

Referring now to FIGURE 2, each reader has a guide foot 28, a read station 30 and a tape drive wheel 32. The tape loop is pulled into the read station 30 under the guide foot 28 and is driven out of the read station by the tape drive wheel 32. The tape loop is then positioned around the guide pins to minimize the remaining slack. Based on the length of the tape, this may require only one pin as in the case of reader 11 or all the pins as on reader 19. The tape is routed over the pins in a relatively taut manner as illustrated in the drawings.

To alleviate operator confusion in routing the tape loops, the number of pins used has been kept to a minimum. In so minimizing the pins it becomes necessary to route the tape over a common pin two or more times in order to take up the slack in the loop. But simply routing the tape at random around the guide pins will not insure proper function. This invention provides that insurance.

A discovery has been made that a particular type of routing is necessary for proper operation. The discovery is that the tape in tension, that is the portion being pulled into the read station 30, must be in direct contact with the guide pin. The tape in compression, that is the portion being driven away from the read station 30, whenever passing over a common guide pin with the tape in tension, must ride on the outside and over the tape being pulled into the read station. A comparison of the results of proper and improper tape routing is set forth in FIGURES 2 and 3 respectively.

In FIGURE 2 the arrow A indicates the direction in which tape portion 34 is being pulled in tension over the guide pin 24*a*. Arrow B indicates the direction tape portion 36 is being pushed over the tape portion 34 and pin 24*a*. The tape portion 34 is not restricted and tape portion 36 will flow over tape portion 34.

Figure 3:
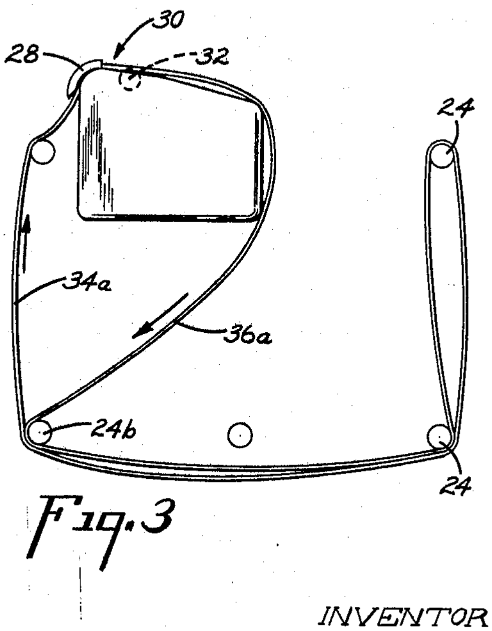
FIGURE 3 is an elevation view of a tape reader illustrating an inoperative tape routing pattern.

In FIGURE 3, however, the tape portion 34*a* is being pulled over the tape portion 36*a*. The tape portion 36*a*, as routed, must be pushed in the opposite direction from that of portion 34*a*. The tape feed wheel 32 draws the tape portion 34*a* into the read station 30, and also pulls the tape in tension over the pin 24*b*. As the portion 34*a* is pulled into the read station 30, it acts as a clamp to bind portion 36*a* to the pin. This binding action may cause damage to the tape or may simply stop the reader, but in either case is undesirable and requires operator attention to correct.

The console 20 in FIGURE 1 illustrates several various tape routing patterns. The readers 10 through 14 show how short tapes can be easily positioned around the guide pins. Readers 15 through 19 are equipped with tapes of longer length. Each tape is routed so the tape portion being pulled in tension is in direct contact with the guide pin. Then, the tape portion which is being fed out of the read station can float over the tape portion in tension and no binding will result.

It is evident that with every substantial tape length change a different routing pattern will be required. But whatever the tape length, each routing pattern must follow the principles set forth above.

I claim:

1. In a source data reading device having a read station with a tape entrance and exit side, on endless length of source data tape and a drive means for pulling said tape into said entrance side and driving said tape out of said exit side, the improvement for condensing the exterior storage area required for said tape, said improvement comprising:

a plurality of guide means arranged about said reading device, the entire tape routed over said guide means with that portion of the tape which is being pulled into said read station being in direct contact with said guide means and pulled in tension over said guide means, and the tape which is being driven away from the read station, whenever directed over any said guide means occupied by the tape in tension, being spaced from said guide means and driven in the opposite direction over the tape being pulled toward said read station.

2. In a source data reading device as defined in claim 1 further characterized in that:

said guide means comprise a plurality of individual cylindrical pins spaced exteriorly of said reading device.

3. In a control system employing a battery of source data reading devices mounted on a common panel, each reading device comprising:

a read station having a tape entrance and exit side;

an endless length of source data tape and a drive means for pulling said tape into said entrance side and driving said tape out of said exit side;

a plurality of individual pin guides spaced exteriorly of said reading device and fastened to said panel; and the tape threaded with respect to said pins with that portion of the tape which is being pulled into said read station being in direct contact with said pins and pulled in tension over said pins, and the tape which is being driven away from the read station, whenever directed over any said pin occupied by the tape in tension, being spaced from said pin by the tape being pulled toward said read station.

References Cited

UNITED STATES PATENTS 3,356,275 12/1967 Wright ............ 226—195

ALLEN N. KNOWLES, Primary Examiner

U.S. Cl. X.R.

226—196